Sept. 17, 1946.  G. J. KOEHLER  2,407,789
FLUID VALVE
Filed June 30, 1943
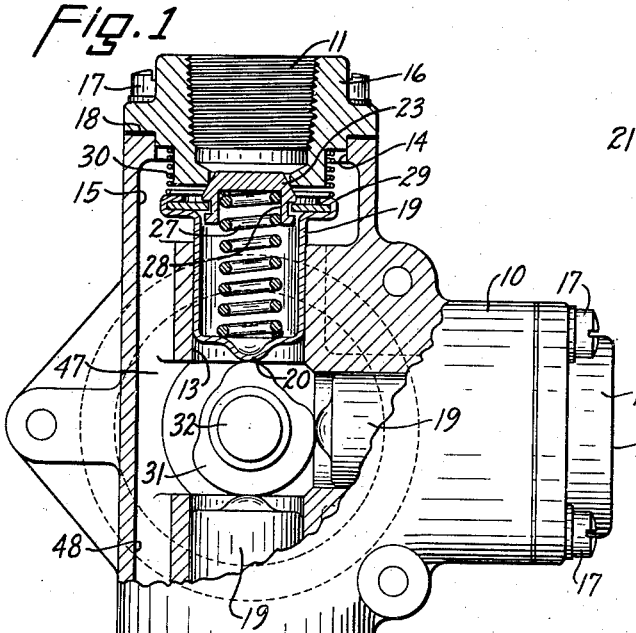
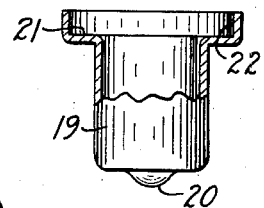
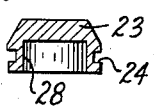
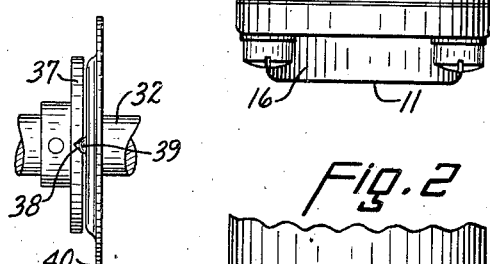
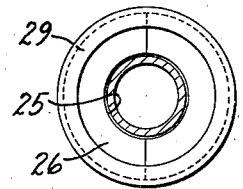
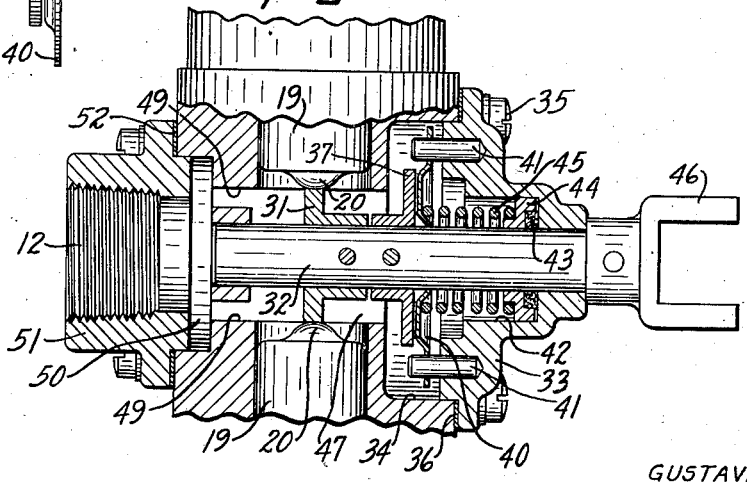
Inventor
GUSTAVE J. KOEHLER
BY Richard Van Buren
His Attorney Patented Sept. 17, 1946

2,407,789

UNITED STATES PATENT OFFICE 2,407,789

FLUID VALVE

Gustave J. Koehler, Dayton, Ohio

Application June 30, 1943, Serial No. 492,882

4 Claims. (Cl. 251—27)

This invention relates to fluid valves and is particularly directed to a self-centering valve member for use in valves for controlling the flow of highly volatile fluids.

It is an object of this invention to provide a self-centering leak-proof valve member for use in valves for controlling the flow of highly volatile fluids.

Another object is the provision of a self-contained valve member having a yieldable seat-engaging element adapted to shift into alinement with the valve seat as the valve closes to compensate for any misalinement between the valve member and the seat.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

In the drawing:

Fig. 1 is a plan view, as observed from beneath, of the entire valve, said view being partially broken away and sectioned to better show the internal construction of the valve.

Fig. 2 is a side view of the valve, said view being partially broken away and sectioned to better show the details of construction.

Fig. 3 is a detail view of one of the cup-shaped valve members.

Fig. 4 is a sectional view of one of the seat-engaging elements.

Fig. 5 illustrates the manner of assembling the seat-engaging elements in the valve members.

Fig. 6 is a detail view of the device for retaining the valve-operating mechanism in any of its various positions.

Description

Heretofore, in valves for controlling the flow of highly volatile fluids, such as gasoline, much difficulty was experienced in maintaining the seat-engaging element or plug in axial alinement with the valve seat. Any out-of-alinement condition between the plug and the seat often resulted in leaking valves, with the many disadvantages, inconveniences, and dangers associated therewith; especially was this true when the valves were used to control the flow of gasoline to internal combustion engines.

The present invention is directed to means for solving the above problems by providing a self-contained valve member for ready insertion into and removal from the valve body, said valve member comprising a self-alining seat-engaging element under spring tension, which element is free to shift circumferentially and/or longitudinally with respect to the member and the seat, when the valve is closing, to aline itself with said seat irrespective of any misalinement existing between said seat and said member.

The valve chosen to illustrate the present invention comprises a body portion 10 having several inlet openings or ports 11 arranged in a plane and radially with respect to the longitudinal axis of the valve, and an outlet port 12 in alinement with the longitudinal axis of the valve. Each of the inlet ports comprises a bore 13 and a counterbore 14 with an enlarged annular recess 15 formed therebetween.

Each of the counterbores 14 has inserted therein the tenon of a seat bushing member 16, said member being secured in place by a plurality of screws 17. A sealing washer 18, clamped between a shoulder of the seat member and the body of the valve, seals said parts against leakage.

Each bore 13 (Figs. 1 and 2) slidably receives the smaller circumference of a cylindrical valve member 19 formed preferably of sheet material. One end of the member 19 is closed and has formed thereon a rounded cam-engaging node 20, and the other end of said member is open and enlarged circumferentially to form a flanged shoulder 21 and an enlarged annular recess 22.

The lower end of the bore in the bushing 16 forms a circumferential seat surface arranged to be engaged by the conical surface on a seat-engaging element or plug 23 (Fig. 4) having an annular groove 24 adapted to be loosely engaged by a hole 25 formed in the identical halves of a split washer 26 (Figs. 1 and 5).

The halves of the split washer 26 are first inserted in the groove 24, after which said washer is placed in the annular recess 22 and the upper end of a compressible spring 27 is simultaneously inserted into a bore 28 in the element 23, the lower end of said spring adapted to engage the bottom of the member 19 (Fig. 1). After the washer 26 is properly assembled in the recess 22 and against the shoulder 21, the edge of said recess is formed over or crimped, as at 29 (Figs. 1 and 5), to secure the parts firmly in place and thus form a complete valve member assembly or unit which may be readily removed from or assembled in the valve body by the simple expedient of removing the bushing 16.

A compressible spring 30 (Figs. 1 and 2) fits around a tenon on the bushing 16 and yieldingly engages the surface 29 to urge the member 19 inwardly to maintain the node 20 in yielding contact with the periphery of a cam 31 secured on a shaft 32, the lower end of which is journaled in a hole in the body 10 and the upper end of which is journaled in a central bore in a cap 33, said bores being in axial alinement. The cap 33 has a tenon which fits in an annular recess 34 in the body 10, said cap being secured to said body by a plurality of screws 35. A sealing washer or gasket 36 is clamped between contiguous faces on the cap 33 and the body 10 to form a fluid seal therebetween.

Secured on the shaft 32 is a locating disk 37 having V-shaped diametrically opposed locating notches 38 (Figs. 2 and 6) corresponding to the different operating positions of the cam 31, which notches cooperate with corresponding diametrically opposed locating ridges 39 embossed in a dished retaining washer 40. The washer 40 has holes which fit freely over studs 41 secured in the cap 33 to hold said washer against rotary movement but to permit axial shifting movement thereof.

The recess 34 connects with a central opening 47 (Fig. 2) in the valve body 10 and, together with said opening, forms a fluid chamber connected to the recesses 15 by passages 48. Openings 49 connect the fluid chamber to an enlarged portion 50 of the axial bore for the shaft 32, said bore 50 arranged to receive the tenon of an outlet bushing 51 secured to the body 10 by suitable screws, and sealed against leakage by a sealing washer 52. The recess 34 provides suitable clearance for the cup washer 40 and the disk 37, and the opening 47 provides suitable clearance for the cam 31.

The central bore in the cap 33 is enlarged into a counterbore 42 (Fig. 2) adapted to receive a sealing washer 43 made of any suitable material and compressed around the shaft 32 and against the bottom of the counterbore 42 by a packing gland 44 under the influence of a compressible spring 45. The spring 45 freely encircles the shaft 32, and one end of said spring fits over a reduced portion of the gland 44, while the other end fits over a conical surface formed around the central hole in the washer 40. The spring 45 is compressed between the gland 44 and the washer 40 to compress the sealing washer, as explained above, to seal the shaft and the cap against leakage and to urge the ridges 39 into yielding engagement with the locating notches 38.

An operating fork 46, secured on the protruding end of the shaft 32, may be connected to any suitable operating mechanism for rotating said shaft and the cam 31 from one position to another, the ridges 39 and the grooves 38 serving to locate and retain said shaft and said cam in any of their various positions.

The valve chosen to illustrate the present invention has three inlet openings or ports with their corresponding seat bushings 16 and valve members 19. However, this is a matter of choice, as the number of inlet ports may be varied from one to the maximum number permissible without departing from the spirit and scope of the invention.

As here shown, the cam 31 is positioned so that high portions of the periphery thereof cooperate with the nodes 20 to close all the inlet ports.

Rotating the shaft 32 and cam 31 one step in either direction causes a high portion of the camming surface of the cam 31 to be moved away from the node 20 of the valve member 19, shown in full cross-section in Fig. 1. This permits the spring 30 to move said member 19 inwardly to move the plug 23 out of engagement with the seat in the bushing 16 to permit the fluid to flow through the corresponding inlet port 11 into the chamber 47 and out the outlet port 12.

Continued rotation of the shaft 32 and the cam 31 causes a high portion of the periphery of the cam 32 to engage the node 20 and shift the member 19 (Fig. 1) outwardly against the action of the spring 30. As the member 19 approaches the extent of its outward movement, the conical surface on the plug 23, in cooperation with the seat opening and due to the lost motion connection between said plug 23 and the split washer 26, shifts said plug 23 axially into alinement with the valve seat to compensate for any misalinement between the valve seat and the member 19.

As the member 19 reaches the extent of its outward movement, the spring 27 is compressed and maintains the plug in yielding engagement with the valve seat to provide a cushioning effect and to insure that the valve closes properly.

The manner in which the valve is constructed obviates the danger of leakage through closed inlet ports caused by built-up pressure in the chamber 47, as any excess pressure therein has a tendency to assist the inlet valves in closing.

Obviously the configuration of the cam 31 may be arranged in any desired manner to effect the desired operation of the valve.

While the form of the invention herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a fluid valve having a body portion, the combination of an element removably connected to said body portion and having a valve seat therein; a valve member operatively mounted in said body portion in substantial axial alinement with the element and removable from said body portion when the element is removed, said member movable in valve opening and closing directions; a part having a tapered seat-engaging surface thereon; an annular groove in the part; a halved washer secured in the valve member and loosely engaging the annular groove to form a lost motion connection between said member and the part, whereupon movement of said member in valve-closing direction causes the tapered surface, in cooperation with the valve seat, to move the part into accurate axial alinement with said seat regardless of any out-of-alinement condition existing between the valve member and the element; and yieldable means between the part and the valve member to cause the tapered surface on said part to resiliently engage the seat to insure a leak-proof seal between said surface and said seat.

2. A unitary valve member, comprising a cylindrical body portion having one end closed and the other end open and enlarged; a valve plug; an annular groove in the plug; and a halved washer, the inner circular portion of which loosely engages the groove and the outer circular portion of which is secured in the enlarged open end of the body portion to form a floating connection between the plug and the body portion, so that the plug is free to move longitudinally and/or radially in relation to the cylindrical body portion.

3. A unitary valve member, comprising a cylindrical body portion closed at one end and open and enlarged at the other end; a valve seat engaging plug; an annular groove in the plug; and a split washer forming a hole which fits loosely in the groove, the outside diameter of said washer adapted to be secured in the enlarged end of the body portion so that the plug is free to move longitudinally and/or transversely in relation to the cylindrical body portion; and yieldable means between the plug and the body portion to cushion the seating impact of the plug.

4. In a valve for controlling the flow of fluid, said valve having a body portion, the combination of a seat element removably mounted in the valve body; a cylindrical valve member movably mounted in the valve body in substantial axial alinement with the seat element and removable when said seat element is removed, said member being closed at one end and open at the other end; an enlarged annular recess formed in the open end of the member; a split washer having identical halves which are secured in the annular recess, said halves forming a round central opening; a tapered seat-engaging plug; an annular groove in the plug, said groove adapted to be loosely engaged by the opening in the split washer to form a lost motion connection between the plug and the valve member; yieldable means between the plug and the member; a rounded node formed on the closed end of the valve member; means cooperating with the rounded node to move the valve member to valve-closing position; and yieldable means to retain the node in resilient engagement with the moving means to move the member to valve-opening position, whereupon movement of said valve member to closing position causes the tapered plug, in cooperation with the valve seat and due to the lost motion connection, to shift into accurate axial alinement with said seat regardless of any slight out-of-alinement condition existing between the valve member and the seat element, the first yieldable means causing said plug to yieldingly engage said seat to insure a leak-proof connection therebetween.

GUSTAVE J. KOEHLER.